United States Patent [19]

Sichling

[11] 4,346,478
[45] Aug. 24, 1982

[54] FIBER OPTICAL SENSOR SYSTEM, PREFERABLY FOR MEASURING PHYSICAL PARAMETERS

[75] Inventor: Georg H. Sichling, Corvallis, Oreg.

[73] Assignee: Siemens Corporation, Iselin, N.J.

[21] Appl. No.: 211,681

[22] Filed: Dec. 1, 1980

[51] Int. Cl.³ .............................................. H04B 9/00
[52] U.S. Cl. .................... 455/612; 455/605; 455/608
[58] Field of Search ............... 455/605, 613, 602, 610, 455/612, 608

[56] References Cited

U.S. PATENT DOCUMENTS 4,071,753  1/1978  Fulenwider ..................... 455/613
4,091,734  5/1978  Redmond ....................... 455/613

OTHER PUBLICATIONS

Unterberger et al., "Application of Optical Transmission in Today's and Future Communication Networks", *Second European Conference on Optical Fibre Communication*, Paris, Sep. 27-30, 1976, pp. 383-387.
K. A. James, W. H. Quick and V. H. Strahan, "Fiber Optics: The Way to True Digital Sensors?", *Control Engineering*, Feb. 1979, pp. 30-33.

*Primary Examiner*—Howard Britton
*Attorney, Agent, or Firm*—Spellman, Joel and Pelton

[57] ABSTRACT

The system contains a fiber optical transmission line, a first light source for emitting a first light beam into a first end of the transmission line, and at least one first light sensitive element for receiving light from a second end of the transmission line. An energy storage device such as a capacitor is connected to the first light sensitive element for energizing various components. The system further contains a second light source for emitting a second light beam into the second end of the transmission line. This source is controlled in dependence upon information to be transmitted, preferably in dependence of a physical parameter. The system finally contains a second receiver element for receiving light from the first end of the transmission line. This element generates an electric output signal which is in accordance with the transmitted information. The system preferably has a large number of transducer units or measuring elements associated with various second ends of the transmission line for transmitting information of various nature and/or from various locations.

32 Claims, 11 Drawing Figures

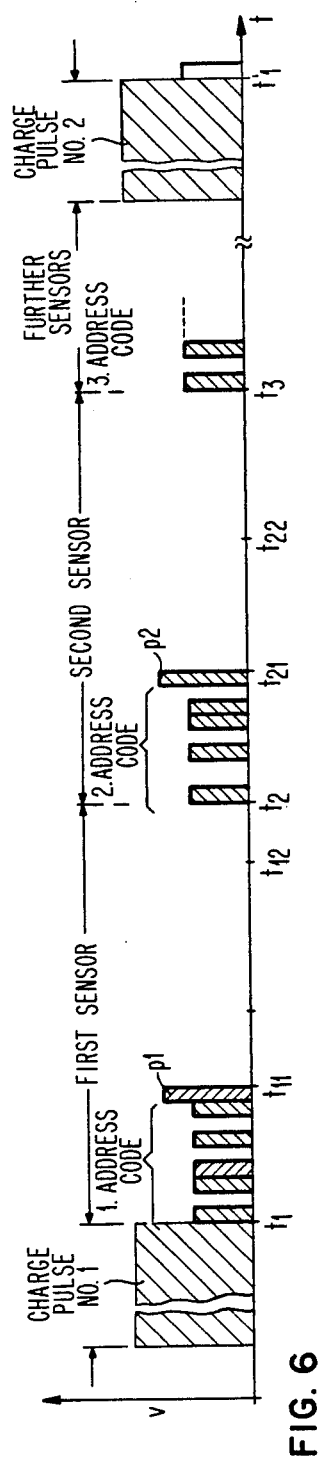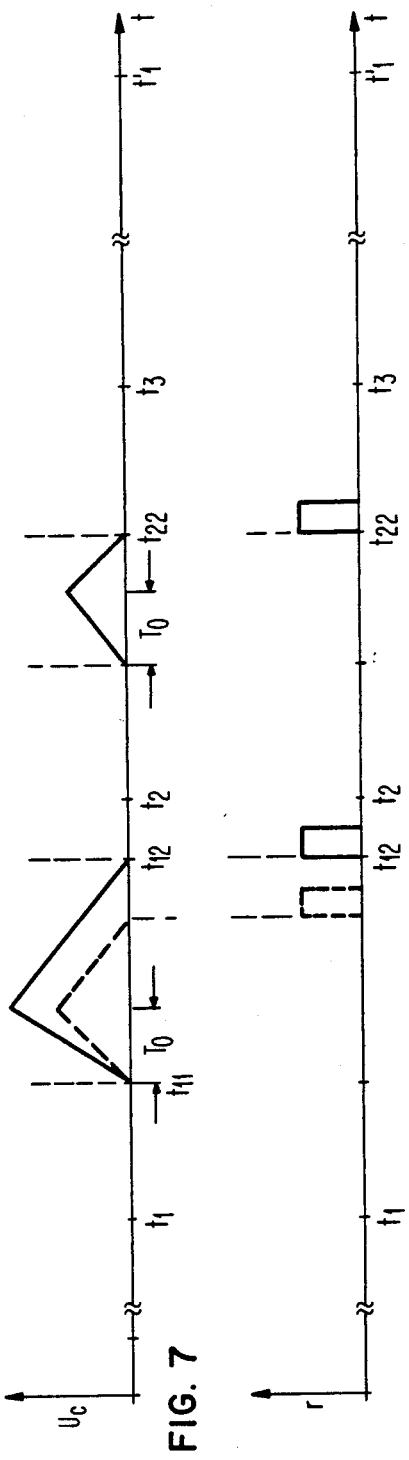

FIBER OPTICAL SENSOR SYSTEM, PREFERABLY FOR MEASURING PHYSICAL PARAMETERS

CROSS REFERENCE TO RELATED APPLICATIONS

This application relates to the same technical field as the application of Georg Sichling, entitled "Fiber Optical Sensor System, Preferably for Use in Automotive Equipment", Ser. No. 211,695, also assigned to Siemens Corporation, filed on the same day as this application.

BACKGROUND OF THE INVENTION

1. Field of the Invention

This invention in general relates to a fiber optical system for transmission of information from one location to another. In particular, this invention relates to a system for measuring one or more physical parameters or data and transmission thereof to evaluation circuitry, which circuitry is located remote from the location of the measurement. Still more particularly, this invention relates to an optical sensor system using at least one transducer for measuring a physical parameter, preferably a multitude of transducers for measuring various physical parameters, and fiber optical means for optical transmission of the sensed parameters to an evaluation circuitry. Such optical sensor system may be applied, for instance, in industrial facilities such as power plants or chemical plants, or in automobiles for the measurement and/or control of various functions.

2. Description of the Prior Art

In "Control Engineering", February 1979, pages 30-33, fiber optical sensors and transducers for measurement of physical parameters are disclosed. These transducers generate digital signals in accordance with the physical parameter being measured without using analog to digital (A/D) converters. The transducers require only light in order to become energized. The aforementioned sensors may be applied for measuring temperature, pressure, flow rate, and similar physical parameters. They are included in fiber optical transmission systems. When multimode fibers are used in these systems, the transmission schemes can be digital intensity modulation (binary, pulse width, frequency, etc.) wave length or color modulation, and color multiplexing.

In the measurement of physical parameters, it is generally desirable that the transducer directly produce digital signals, rather than require an electric A/D converter. Further, the transducer should require power only in the form of optical power. In addition, the design of the transducer and the optical transmission line should be such that the system can withstand hostile environments, including electromagnetic interference.

In "Control Engineering", supra, page 32, third column, and page 33, lower figures, a fiber optical sensor system is disclosed which works as a luminescent temperature transducer. The system includes a pulsed light source which emits light pulses into the first end of a fiber optical cable. The remote sensor is simply the expanded second end of the fiber optical cable, which end is coated with or is embedded in a phosphorescent material. Phosphorescence of this material occurs after each light pulse which has been received from the light source. A response or return light signal is emitted from the phosphorescent material in backward direction through the fiber optical cable. By means of a light coupler associated with the first end of the optical cable, the response signal is coupled to a photodetector. The electric output signal of the photodetector, that is the post-excitation return signal, is fed into a sample-hold or time-constant measurement device. Here, the decay time constant of the phosphorescent process is measured. The temperature sensor system provides a pulse width which is proportional to the decay time constant, and therefore, proportional to the temperature to which the phosphorescent material is exposed. This fiber optical sensor system is based on the measurement of a decreasing analog signal and therefore subject to disturbing influences. In addition, the costs for such a system may be high. Thus, there is a need for a fiber optical sensor system which is not only precise and reliable, but which is also inexpensive to manufacture. Such a system should have some sort of energy source on the measurement side so that active electric devices, such as transistors, may be energized. The system should derive the required power from optical signals transmitted through a fiber optical transmission line, and it should not require any additional sources of electric power at the location(s) of measurement.

A fiber optical sensor system of the kind just described appears to be particularly suited for use in automobiles. In conventional automotive applications, more than a dozen parameters are sensed at the automobile engine alone, and more than a dozen other parameters are measured at other locations of the automobile. A sensor system applied in a car should require only a minimum of cabling, should be extremely reliable, even under extreme environmental conditions like heat, cold, humidity, vibration, chemical and mechanical stress, and also under the usual wear and tear to which an automobile is subjected. A fiber optical transmission cable by nature would be little effected by all these factors and would exhibit the additional advantage that is not subject to electromagnetic interference, which may be generated by the ignition system of the car and by other devices. Therefore, in automobile applications an electro-optical sensor system may be used widely, if such a system could be manufactured inexpensively and if the accuracy required for the sensors can be obtained. This is not only true for automobile applications, but also for other applications with similar requirements, such as industrial applications.

SUMMARY OF THE INVENTION

Objects

It is an object of this invention to provide a fiber optical sensor system for transmission of information from one location to another, whereby an independent power source, such as a battery, a power line or an electric outlet, is not available on said one location.

It is another object of this invention to provide a fiber optical sensor system for transmission of information from one location to another through a fiber optical transmission line, wherein power is optically transmitted to said one location from the other location through the very same fiber optical transmission line.

It is still another object of this invention to provide a fiber optical sensor system having a measurement side and an evaluation side, wherein an electric power source is provided on the evaluation side, and wherein an additional power source is not required on the measurement side.

It is still another object of this invention to provide a fiber optical sensor system having a measurement side and an evaluation side, wherein various measurement signals delivered by a plurality of transducers may be transmitted as optical signals via a single fiber optical transmission line or cable from the measurement side to the evaluation side.

It is still another object of this invention to provide a fiber optical sensor system which allows for the measurement of a multitude of physical parameters under rough environmental conditions.

It is still another object of this invention to provide a fiber optical sensor system which allows for the measurement of a multitude of physical parameters and which nonetheless requires only a comparatively small expenditure.

It is still another object of this invention to provide a fiber optical sensor system in which all different kinds of physical parameters can be transmitted and measured, such as temperature, pressure and mass flow.

It is still another object of this invention to provide a fiber optical sensor system which includes a comparatively high number of transducers, for instance, twenty or more.

It is still another object of this invention to provide a fiber optical sensor system which requires only a single light source on the first side of a fiber optical cable for addressing and energizing a plurality of transducers on the second side of said fiber optical cable.

It is still another object of this invention to provide a fiber optical sensor system having only low power requirements, such that the power can be taken, for instance, out of a car battery.

It is still another object of this invention to provide a fiber optical sensor system which can withstand hostile environmental conditions, such as humidity, oil, acid and vibrations.

It is still another object of this invention to provide a fiber optical sensor system for transmission of a physical parameter from a location of measurement to a location of evaluation, wherein electromagnetic disturbances at the location of the measurement do not have any impact on the measurement results.

It is still another object of this invention to provide a fiber optical sensor system in which external disturbances, such as electromagnetic interference (emi), do not have an impact on the measurement results, that is to provide such a system wherein the transmission of information is immune against disturbances from outside the system.

It is still another object of this invention to provide a fiber optical sensor system for measurement of various physical parameters which provides the capability of system expansion, if additional parameters are to be measured.

It is still another object of this invention to provide a fiber optical sensor system which can be manufactured relatively simply and inexpensively.

It is still another object of this invention to provide a fiber optical sensor system which can be used for automotive applications.

It is still another object of this invention to provide a fiber optical sensor system which has an overall accuracy sufficient for an application in an automobile.

Summary

According to this invention, a fiber optical sensor system for transmission of information from one location to another contains a fiber optical transmission line or cable. This transmission line has a first end and a second end for transmitting light therebetween. The system also contains a first light source for emitting a first light beam into the first end of the transmission line. At the second end of the transmission line is arranged at least one first receiver element which is sensitive to the light of the first light source. This first receiver element is provided for receiving light of the first light source from the second end of the transmission line and for generating a first electric output signal in accordance with the light received. An electrical energy storage device is connected to the first receiver element. It will receive the first electric output signal. This device will store energy in accordance with the optical energy transmitted through the transmission line. At the second end of the transmission line is also arranged a second light source. This second light source is provided for emitting a second light beam into the second end of the transmission line. The second light source is energized from the electrical energy storage device, and it is controlled according to the information to be transmitted. There is also provided a second receiver element sensitive to the light of the second light source. The second receiver element will receive light of the second light source from the transmission line. This second receiver element is provided for generating a second electric output signal in accordance with the light received. This signal is in accordance with the transmitted information.

The energy storage device preferably may comprise a storage capacitor which is connected to the first receiver element. The capacitor will derive an electrical charge from the receiver element when the first light source emits the first light beam. The capacitor is the energy source used for energizing the second light source.

The system is applicable for transmission of various physical parameters. These parameters may be sensed by any kind of sensor, such as an electromechanical or photoelectric sensor.

The fiber optical sensor system may be designed such that besides the second light source, further electronic components are connected to be energized from the energy storage device.

According to this invention, a preferred embodiment of the fiber optical sensor system for measuring at least one physical parameter may comprise:

(a) a first light source for emitting a first light pulse;

(b) at least one first receiver element which is sensitive to the light of the first light pulse;

(c) a fiber optical transmission line having two sides, whereby the first light pulse is transmitted from the first light source arranged on the first side of the transmission line, to the first receiver element arranged to a second side of the transmission line;

(d) a sensor element containing a resistor-capacitor combination, the time constant of which combination is dependent on the physical parameter to be measured;

(e) a device for changing the charge of the capacitor in accordance with the time constant of the resistor-capacitor combination, whereby such a change will be initiated when the first receiver element detects the first light pulse;

(f) a sensing device for sensing the voltage of the capacitor and for determining the point of time when the voltage of the capacitor has reached a predetermined value;

(g) a second light source arranged on the second side of the transmission line for emitting a second light pulse or response pulse when the capacitor voltage has reached the predetermined value, whereby the second light pulse is transmitted from the second side of the first side of the transmission line;

(h) a second receiver element sensitive to the light of the second light pulse, the second receiver element being arranged on the first side of the transmission line; and (i) a measuring device for measuring the time difference between the first and the second pulse, whereby this time difference is a function of the physical parameter to be measured.

The term "information" as used herein is intended to be applied in its most general form and comprises all sort of information, such as data, signals, physical parameters, measurement results, communication signals and code words.

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings:

FIG. 6 is a time diagram showing light pulses (charge pulses and encoded identification pulses) transmitted to the measuring side of the sensor system of FIG. 1;

FIG. 7 is a time diagram showing the voltage of a capacitor which is charged and discharged in response to a physical parameter, the capacitor being a component of the circuitry of FIG. 3;

FIG. 8 is a time diagram showing light return pulses which are emitted from the measuring side to the evaluation side of the sensor system in FIG. 1;

DETAILED DESCRIPTION OF THE PREFERRED EMBODIMENTS

Figure 1:
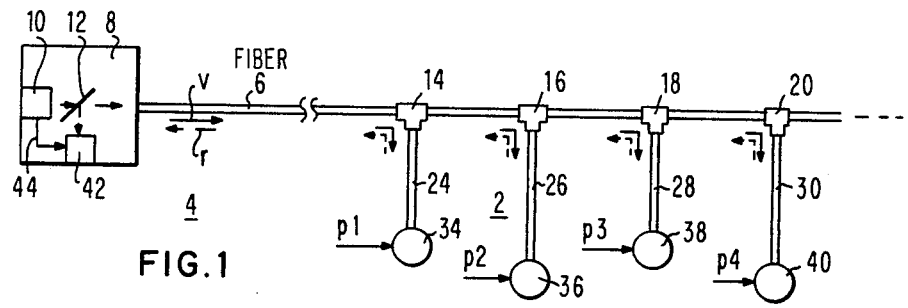
FIG. 1 is a schematic view of a fiber optical sensor system having on its measurement side various measurement elements including transducers which are exposed to various physical parameters, and on its evaluation side a primary light source and an evaluation circuit.

In FIG. 1 a fiber optical sensor system for transmission of physical parameters p1, p2, p3, p4 . . . from a location of measurement or measuring side 2 to a remote location of application or control and evaluation side 4 is illustrated. The sensor system is preferably applicable in the control and/or testing of automobiles. This design does not depend on the amplitude of an optical beam and does not exhibit any specific problems of accuracy.

The system includes a fiber optical transmission line or transmission cable 6 for transmission of light in either direction. On its control and evaluation side 4, the transmission line 6 is operatively connected to an emitter and receiver device 8. The device 8 includes a first light source 10 for emitting a first light beam through a beam splitter 12 into the left end of the fiber optical transmission line 6. The light source 10 may be a light emitting diode (LED), a laser or a GaAs light emitter. The transmission line 6 leads to the measuring side 2. Here, the fiber optical transmission line 6 passes various coupling elements 14, 16, 18 and 20, four of which are illustrated. There may be provided more than four coupling elements 14, 15, 18 and 20. The coupling element 14-20 may be, for instance, T-couplers or branching elements, such as disclosed in "Applied Optics", Vol. 16, No. 8, August 1977, pages 2195-2197. The four coupling elements 14-20 serve to distribute the first light beam among four fiber optical branches 24, 26, 28 and 30, respectively. At the end of these branches 34-40, there are provided measuring elements 34, 36, 38 and 40, respectively, which measure the physical parameters p1-p4, respectively, of the automobile. The parameters p1-p4 may be, for instance, pressure, temperature, gas flow and speed.

As will become apparent later, the measuring elements 34-40 each contain a first receiver element which is sensitive to the light of the first light source 10. The first receiver elements generate first electric output signals in accordance with the light which they receive. The measuring elements 34-40 each also contain an electrical energy storage device which is supplied by the first electric output signal and which will store the energy contained in such signal. Each of the measuring elements 34-40 further contains a second light source for emitting a second light beam back into the branches 24-30, respectively. From here, the second light beam passes through the respective coupling elements 14-20 into the left end of the fiber optical transmission line 6 on the control and evaluation side 4. From this end, the second light beam is transmitted into the device 8. Each of the second light sources within the individual measuring elements 34-40 is energized from the associated electrical energy storage device. These light sources which all have the same characteristics are controlled in a dependence of the physical parameters p1-p4, respectively. Thereby, the information represented by the physical parameters p1-p4 is optically transmitted from the measuring side 2 to the control and evaluation side 4. Transmission of the parameters p1-p4 is performed one after another.

On the control and evaluation side 4, the light from the second light source is transmitted through the beam splitter 12 to an evaluation circuitry 42. The evaluation circuitry 42 contains a second receiver element which is sensitive to the light of all second light sources. It generates a second electrical output signal in accordance with the light received and thereby in accordance with the physical parameter p1, p2, p3 or p4 transmitted.

In FIG. 1 the light paths from the emitter and receiver device 8 to the individual measuring elements 34-40 are indicated by straight arrows, whereas the light paths from the measuring elements 34-40 back to the device 8 are indicated by broken arrows.

In the emitter and receiver device 8, there is also provided an address line 44 which leads from the light control circuitry for the light source 10 to the evaluation circuitry 42. Through this address line 44, information is transmitted indicating the measuring element 34, 36, 38 or 40 which is being addressed by the control circuitry. Therefore, in the circuitry 42 the received signal can be assigned to the measuring element 34-40 which has responded.

Figure 2:
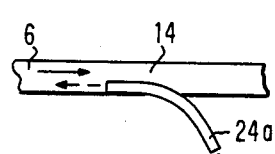
FIG. 2 is a detailed view of a branching element which can be used in the sensor system of FIG. 1.

In FIG. 2, an embodiment of the coupling element 14 is illustrated. The coupling element 14 is here designed as a well-known branching element. A small fiber line 24a branches off the main fiber optical transmission line 6. The coupling elements 16-20 may be designed in a similar way.

Figure 3:
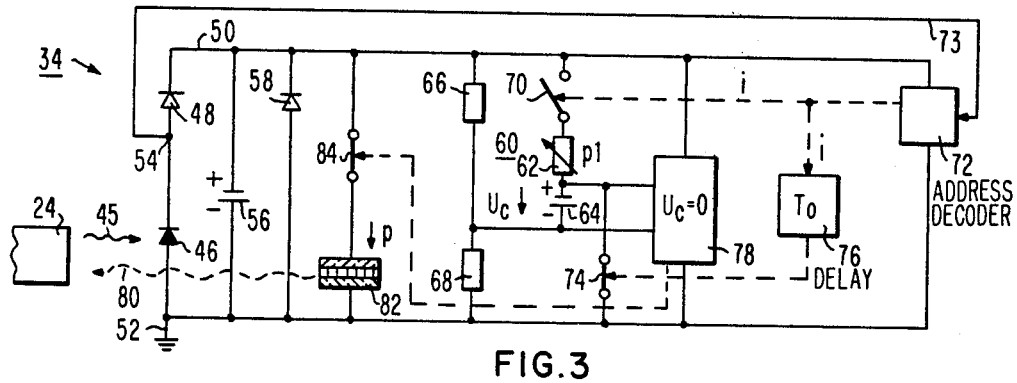
FIG. 3 is an opto-electrical circuitry which can be used on the measuring side of the sensor system of FIG. 1, wherein a resistor is applied as the sensor element.

In FIG. 3 an embodiment of one of the measuring elements 34-40 is illustrated. This embodiment may be, for instance, the measuring element 34.

It will be noted that the end of the fiber optical branch 24 which emits the first light beam 45 is arranged close to a first receiver element 46. This first receiver element 46 may be a small photo diode or an arrangement of various photo diodes. The element 46 receives the first light beam 45 from the branch 24 and generates an output voltage in accordance with the light received. Between the end of the branch 24 and the first receiver element 46, there may be arranged optical means for concentrating the radiation on the light sensitive area of the element 46. The first receiver element 46 is connected in series with a diode 48 for generating a supply voltage between a supply voltage bus 50 and ground 52. The connection point between the element 46 and the diode 48 is designated as 54. The series connection 46, 48 is coupled to an energy storage device 56. The storage device 56 is designed as a storage capacitor. A Zener diode 58 is connected parallel to the storage capacitor 56. This Zener diode 58 serves to keep the voltage of the storage capacitor 56 constant. The storage capacitor 56 derives electrical charges from the first receiving element 46 when the first light source 10 emits the first light beam 45. It stores these charges and energizes various electronic components in the measuring element 34, as will be discussed below.

The measuring element 34 further contains a transducer unit 60 for transforming the physical parameter p1 to be measured into a corresponding electrical quantity and subsequently into an optical signal. For this purpose, the transducer unit 60 contains an RC combination formed by a resistor 62 and a capacitor 64 which are connected in series. The components forming the RC combination 62, 64 are selected such that the time constant of the RC combination 62, 64 is dependent on the physical parameter p1 to be measured. In the embodiment illustrated in FIG. 3, the resistor 62 is exposed to the parameter p1, and the resistance of the resistor 62 is directly dependent on the parameter p1, whereas the capacitance of the capacitor 64 remains constant. The resistance may vary, for instance, in accordance with temperature or pressure. Thus, the resistor 62 may be considered as the sensor proper of the measuring element 34 of the fiber optical sensor system.

The transducer unit 60 contains a voltage divider formed by the series connection of a first resistor 66 and a second resistor 68. This voltage divider 66, 68 is connected between the supply voltage bus 50 and ground 52. The first resistor 66 represents a first voltage source of a fairly constant first supply voltage, and the second resistor may be considered as a second voltage source of a second supply voltage that is also fairly constant.

The series connection consisting of the sensor resistor 62 and the capacitor 64 is coupled through a first switching element 70 to a supply voltage source. This supply voltage source is the first voltage source represented by the first resistor 66. The first switching element 70 preferably is an electronic switch, such as a FET. It is controlled by an initiation signal which is derived from a control device, specifically from an address decoder 72.

The address decoder 72, which is energized from the supply voltage bus 50, decodes an input signal arriving on its input line 73. The input line 73 is connected to the connection point 54. Whenever the decoded input signal indicates that the address decoder 72 has been addressed by the first light beam 45, an output pulse is issued as an initiating signal i. The instant when this pulse appears at the output of the address decoder 72 will be termed the first point of time. The control line between the address decoder 72 and the first switching element 70 is shown in FIG. 3 as a broken line.

The first switching element 70 in combination with the first voltage source (resistor 66) may be considered as a device for changing the charge of the capacitor 64 in accordance with the time constant of the RC combination 62, 64. Particularly, the first voltage source (resistor 66) is determined to charge the capacitor 64 through the resistor 62. Therefore, the initiation signal i issued to close the first switching element 70, may be considered as a "start charge" signal. In the ON position of the first switching element 70, the capacitor 64 will be charged to obtain a voltage $U_c$ of the polarity indicated in FIG. 3.

The transducer unit 60 also includes a device for discharging the capacitor 64 after it has been charged. This device basically includes the second voltage source as represented by the second resistor 68, a second switching element 74, and a delay circuit 76. The second switching element 74 which may be a transistor such as a FET, is connected parallel to the series connection of the capacitor 64 and the second resistor 68. It is actuated by the delay circuit 76, which in turn is supplied with the initiation signal i from the address decoder 72. The delay circuit 76 has a delay time $T_o$ which is fixed. The delay circuit 76 may be designed, for instance, as a counter which issues an output pulse after the initiation signal has been received. The output pulse is delayed by the delay time $T_o$ with respect to the initiation signal i. The second voltage source (resistor 68) has a reverse polarity with respect to the charged capacitor 64. As soon as the second switching element 74 is closed (ON position), the voltage of the second voltage source (resistor 68) counteracts the capacitor voltage $U_c$, so that the capacitor 64 is discharged.

The transducer unit 60 also contains a device 78 for sensing the voltage of the capacitor 64 and for determining a second point of time, which is precisely the instant when the capacitor voltage $U_c$ has reached a predetermined value. In particular, this predetermined value may be zero volts.

The voltage sensing device 78 may be formed by a comparator such as a flip-flop. The voltage sensing device 78 is a control unit. It is part of an electro-optical device for emitting a second light beam which is directed into the face end of the fiber optical branch 24. In particular, the device 78 generates a return or response light pulse 80. Part of the electro-optical emitting device is also a second light source 82. This light source 82 may be a light emitting diode (LED) or a laser, preferably a GaAs light emitter. It should be mentioned that the wavelength characteristics of the second light source 82 may be different from the wavelength characteristics of the first light source 10 (shown in FIGS. 1 and 5). The second light source 82 is connected in series with a third switching element 84 between the supply voltage bus 50 and ground 52. The third switching element 84 may be a transistor such as a FET. It is actuated by the output of the voltage sensing device 78, as indicated by a broken control line. When the third switching element 84 is brought into its closed position (ON position), the energy storage capacitor 56 will supply the second light source 82 with electric energy for emission of the return pulse 80.

From the preceding description of the voltage device 78 it has become apparent that the second light source 82 will emit the return pulse 80 when the voltage of the capacitor 64 has reached the predetermined voltage value at the second point of time. Since the time difference between the second and the first point of time is an indication of the value of the parameter p1, the occurence of the return pulse 80 with respect to the first point of time will be determined on the control and evaluation side 4. Therefore, the return pulse 80 is transmitted from the second light source 82 through the branch 24 to the left end of the fiber optical transmission line 6 (FIG. 1) and from there to the evaluation circuitry (FIG. 1). During the emission of the return pulse 80, the storage capacitor 56 will be discharged. Since this measuring method is based on the measurement of pulses, it can be termed pulse code modulation.

Thus, it is obvious that the storage capacitor energizes the address decoder 72 and the voltage sensing device 78. It also serves as an energy source for charging and discharging the capacitor 64 and for activation of the second light source 82 which sends out the response pulse 80.

Figure 4:
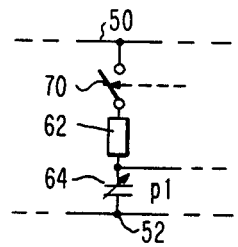
FIG. 4 is a partial view of an opto-electrical circuitry similar to FIG. 3, wherein a capacitor is applied as the sensor element.

In FIG. 4 is illustrated another embodiment of the measuring element 34, whereby only a section of the electric circuit is shown. Further components and connections may be chosen as in FIG. 3. In this embodiment the capacitance of the capacitor 64 may vary in accordance with the physical parameter p1, whereas the resistance of the resistor 62 is constant. Since the charging time and the discharging time of the capacitor 64 is dependent on the capacitance, the time difference between the second and the first point of time is again a function of the physical parameter p1.

It should be mentioned that RC combinations other than those illustrated in FIGS. 3 and 4 may be chosen. For instance, it may be sufficient to use the wiring resistance as a resistor 62 of constant value.

Figure 5:
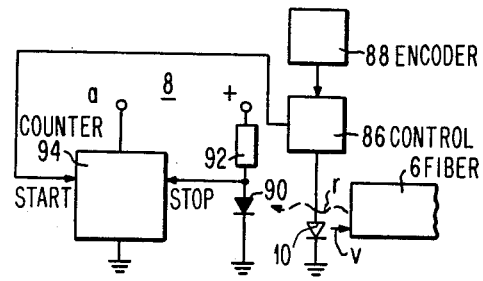
FIG. 5 is a more detailed embodiment of the evaluation circuitry shown in FIG. 1.

In FIG. 5 an embodiment of the emitter and receiver device 8 is illustrated. The first light source 10 is controlled by a control unit 86. This control unit 86 provides for the emission of charge light pulses which are used for energizing the measuring elements 34-40. The first light source 10 is not only a source for transmitting energy on the measuring side 2. It is also used as a signal source. For this purpose an encoder 88 is provided. The encoder 88 controls the first light source 10 as to emit a series v of coded light pulse patterns. Each of these coded light pulse patterns addresses a particular address decoder 72 in one of the measuring elements 34-40. With each individual address decoder 72 a predetermined and individualized pulse pattern is associated. Each of the decoders 72 on the measuring side 2 issues an initiation signal i when the transmitted coded light pulse pattern corresponds to the predetermined pulse pattern contained or stored therein.

According to FIG. 5, the evaluation circuitry comprises a second receiver element 90 which is sensitive to the light of any of the second light sources 82 on the measuring side 2. This second receiver element 90 preferably may be a photo diode. It is connected in series with a resistor 92 to a voltage source. The second light source 90 receives the return light pulse r from the transmission line 6 and generates a second electric signal in accordance with the light received. In other words, whenever one of the second light sources 82 of the measuring elements 34-40 emits a return light pulse 80, an electric pulse is generated by the element 90. This pulse is conducted to a time measuring stage 94. The stage 94 measures the difference between the second and the first point of time, whereby this time difference is a function of the physical parameter to be measured, and issues an output signal a accordingly. The stage 94, for instance, may be a counter which is started from the control unit 86 by a start signal that coincides with the initiation signal used on the measuring side 2. The counter is stopped by the pulse from the light sensitive element 90. The time lapse between "start" and "stop" is a function of the physical parameter to be measured.

In FIGS. 6 through 8 diagrams referring to the operation of the fiber optical sensor system are illustrated.

In FIG. 6 the sequence v of light pulses emitted from the first light source 10 is shown. First a primary optical pulse or charge pulse no. 1 is generated by the first light source 10. This charge pulse no. 1 passes the beam splitter 12 and enters the optical fiber cable 6. Light which passes the coupling elements 14-20 and exits from the branches 24-30 hits the photo diode 46 in each of the measuring elements 34-40, respectively. The photo diode 46 converts the light into an electric voltage which charges the storage capacitor 56. The capacitor 56 feeds the transducer unit 60, the address decoder 72 and the comparator 78 through the supply voltage bus 50. Thus, the charge pulse no. 1 serves to charge all capacitors 56 of the measuring elements 34-40. From the trailing edge of the charge pulse no. 1 the decoder 72 determines that the charge pulse no. 1 is terminated. For instance, a flip-flop may be activated by the trailing edge. However, it is also possible to start a counter with the leading edge which delivers a termination pulse after a given period of time.

Subsequently, at a point of time t1, first address code pulses are generated. These pulses may be of smaller amplitude than the charge pulse no. 1. These first address code pulses are assigned to the first measuring element to be addressed, for instance the measuring element 34. Corresponding electrical pulses are generated and fed to the address decoder 72 for address recognition and decoding.

Subsequently, a start pulse p1 is generated by the light source 10. This pulse p1 may have a higher amplitude than the first address code pulses.

The recognition of the address code in the first measuring element 34 causes the generation of the initiation signal i which initiates charging and discharging of the capacitor 64. In the present embodiment, the electrical pulse corresponding to the start pulse p1 is simply passed through the decoder 72 onto the first switch 70. After the fixed delay time $T_o$, this pulse will also actuate the second switch 74. The trailing edge of the start pulse p1 determines the first point of time t11, that is the instant when the first switch 70 is closed. At the point of time (t11+$T_o$), the second switch 74 is closed, whereas the first switch 70 may be opened.

As can be seen in FIG. 7, the capacitor voltage $U_c$ will rise from the first point of time t11 on and decrease after the delay time $T_o$ has elapsed. At the second point of time t12 the capacitor voltage $U_c$ will have arrived at the predetermined value of zero volts. In FIG. 7 can be seen that this second point of time t12 is shifted on the time axis t when the value of the parameter p1 is changed. A voltage curve corresponding to a second value of the parameter p1 is shown in broken lines.

The output signal of the comparator 78 is generated at the second point of time t12. This output pulse closes the third switching element 84 which thereupon discharges the load of the storage capacitor 56 across the second light emitting element 82. The stored energy is converted into a return light pulse 80 which is transmitted back into the fiber optical cable 6. In FIG. 8 is shown the return light pulse r which is emitted toward the evaluation circuitry 42 at the second point of time t12. In FIG. 8 is also shown in broken lines a return pulse r which would be created if the capacitor 64 would be charged and discharged according to a capacitor voltage $U_c$ following the broken lines in FIG. 7.

The time interval between the return pulse (time t12) and the start signal (time t11) is a measure of the value of the time constant of the RC element 62, 64 which in turn is a measure of the physical parameter p1 to be measured. This time interval (t12-t11) is measured by the counter 94 (see FIG. 5). In other words, the measurement of the parameter p1 is performed as a measurement of a time interval.

After the return signal r from the first measuring element 34 has been received and after a short pause, the next measuring element 36 is addressed by second address code pulses at a point of time t2 (see FIG. 6). As will be noted in FIG. 6, the second address code is different from the first address code. Therefore, only address decoder 72 of the second measuring element 36 will now be activated to pass along the following start pulse p2. After a certain period of time, at a second point of time t22, the measuring element 36 sends back a return light pulse r which can be seen in FIG. 8. The time difference (t22-t21) between the return pulse (see FIG. 8) and the start pulse (see FIG. 6) is again a measure of the physical parameter p2 to which the transducer unit 60 in the second measuring element 36 is exposed.

The measurement of the parameters p3 and p4 is performed in the same way. After this has been accomplished, a new measurement cycle is started by emitting a charge pulse no. 2 determined to energize the measuring elements 34-40 again. Subsequently, the first pulse pattern is emitted again. This first pattern is again addressed to the first measuring element 34 which in turn will send out again a return pulse 80. Thus, a change of the parameter p1 between this and the preceding measurement cycle can be determined.

Figure 9:
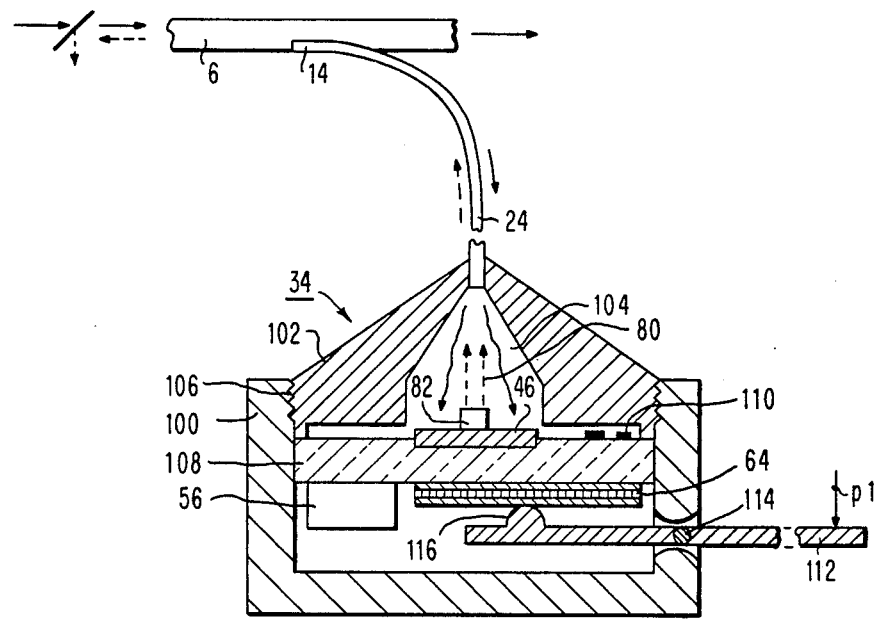
FIG. 9 is a cross section of a mechanical design of one of the transducers shown in FIG. 1.

In FIG. 9 is illustrated the mechanical design of a measuring element 34 which is connected through a fiber optical cable 24 and a fiber optical branching element 14 to the main fiber optical cable 6. This measuring element 34 is part of a fiber optical sensor system which may have various applications. For instance, it may be applied in an automobile control device or in a process or industrial control device. Such a system can also be used for data transmission, for supervision and control in power plants, for instance in nuclear plants, and for tests in aerospace.

The measuring element 34 contains a housing which is formed by a container 100 and a cap 102. The container 100 basically has the shape of a cylindrical pot. It is made of a metal. The cap 102 forms the top of the housing. It is also made of a metal and has the shape of a cone.

The cap 102 contains a central cavity or light channel 104. The fiber optical cable 24 merges into the top of this light channel 104. The cap 102 is attached to the inner walls of the container by means of a lead screw 106 in the upper part thereof. The interior of the housing is shielded against electromagnetic interference since the container 100 and the cap 102 are made of metal.

The interior of the housing contains a supporting plate or board 108 which has the shape of a disc. This plate or board 108 may be a circuit board carrying various electronic components. Preferably it is a silicon chip which contains or incorporates a plurality of components and integrated circuits that form receiver and emitter circuits. Preferably, the integrated circuits may be so-called large scale IC. The supporting plate 108 is attached to the inner walls of the container by a ring (not shown) or by any other suitable means.

As illustrated in FIG. 9, the supporting board 108 supports the first light receiving element 46. This element may be a light sensitive diode, for instance, working on a silicon basis. The light receiving element 46 has the shape of a disc. It is centered on the supporting plate 108 opposite the end of the fiber optical cable 24. Its diameter approximately corresponds to the width of the light channel 104.

Supported by the first light receiving element 46 is a second light source or light emitter 82. This second light source 82 may be a light emitting diode (LED) or a laser, in particular a GaAs light emitter. The second light source 82 is the return signal generator, which emits the return pulse 80. It is arranged on the central axis of the container so that it is positioned just opposite to the face end of the fiber optical cable 24.

The upper end face of the supporting plate 108 may also support electrical components which are designated as 110. These components may form the address decoder 72 and other circuits. The lower end face of the supporting plate carries an energy storage device such as a supply or storage capacitor 56.

The side wall of the container contains a hole. Through this hole a lever 112 extends into the interior of the housing. The lever 112 is pivotally attached to the housing by means of a pivot 114 which is located in the hole itself or close thereto. The inner portion of the lever 112 has a protrusion 116 on its upper side. This protrusion 116 engages a sensor capacitor 64, the capacitance of which is variable in accordance with FIG. 4. The sensor capacitor 64 is firmly attached to the lower end face of the supporting plate 108. The capacitor 64 is made of two plates between which an electrolytical fluid is arranged. By means of the lever 112, the parameter p1 is transferred into a change of the capacitance of the capacitor 64 and thereby into an electrical quantity.

The sensor capacitor 64 shown in FIG. 9 is sensitive to the force exerted by the protrusion 116 of the lever 112. Thus, the sensing element 34 is a force or pressure sensitive element. The capacitance and consequently the voltage of the capacitor 64 vary in accordance with the parameter p1. A change of this parameter p1 may be, for instance, caused by a change of temperature, pressure, or flow.

Instead of the force sensitive capacitor 64 shown in FIG. 9, various other sensors may be applied. For instance, there may be applied an element which changes the distance in dependence on the temperature, or which changes the dielectric constant in dependence on the temperature. There may also be a temperature sensitive resistor 62 which is implemented on the silicon chip 46 or on the GaAs chip 82, and in this case heat transfer to the resistor 62 may occur directly through the housing. It is also possible to connect external resistor strips to the sensor element. Similar designs are possible with pressure sensitive actuators.

Figure 10:
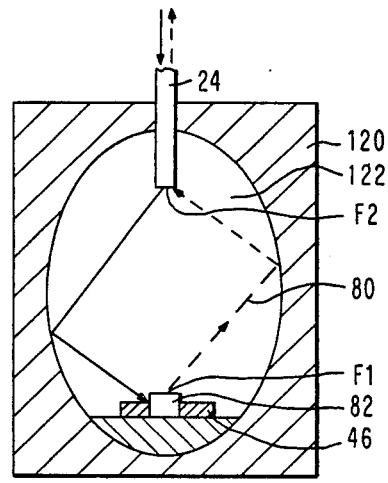
FIG. 10 is a cross section of a measuring element incorporating a housing having a cavity in the form of an ellipsoid.

In FIG. 10 the cross section of a housing 120 is illustrated which contains a cavity 122 in the form of an ellipsoid. This cavity 122 is provided with reflecting walls. That is, the walls reflect very well the wavelength of the light which is transmitted into the cavity. The walls may be coated with silver. The cavity 122 is sealed from the outside to preserve good optical properties.

The ellipsoidal cavity 122 is characterized by its focal points $F_1$ and $F_2$. A second light source 82 is located in the first focal point $F_1$. This light source 82 is supplied with power from the exterior. For instance, this light source 82 may be a GaAs laser. The light emitted from the second light source 82 will be collected in the second focal point $F_2$. In this focal point $F_2$, there is arranged the end face of a fiber optical cable 24 which leads out of the cavity 122. Light emitted from the first light source will enter the cavity through the end face of the fiber optical cable 24. This light will be collected by the first optical receiver or photo diode 46 which is arranged around the first focal point $F_1$.

The reflection on the ellipsoidal side walls provides for a high power coupling.

Figure 11:
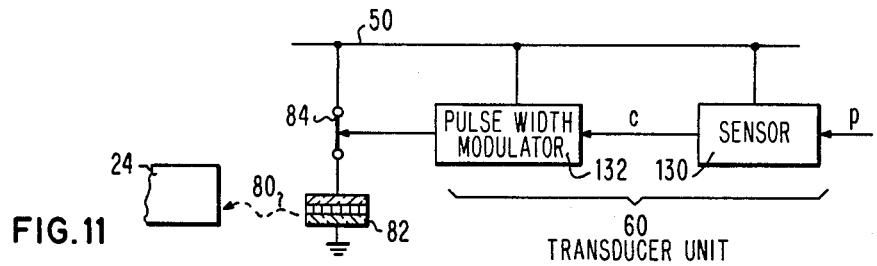
FIG. 11 is an opto-electrical circuitry which includes a pulse width modulator and which can be used on the measuring side of the fiber optical sensor system of FIG. 1.

In FIG. 11 is illustrated the basic design of another embodiment of the measuring element 34. As indicated earlier, the transmission of information according to FIG. 3 is pulse code modulated (PCM). In contrast thereto, the transmission according to FIG. 11 is pulse width modulated (PWM). The energy transmission and storage device may be the same as in FIG. 3.

According to FIG. 11, the transducer 60 is energized again from the main supply voltage bus 50. This transducer 60 contains a sensor 130. The sensor 130 is exposed to a change of a physical parameter p, for instance, a change of a distance or temperature, and it delivers at its electrical output a control signal c. This control signal c is supplied to a pulse width modulator 132 which issues pulses the length of which corresponds to the control signal c. It will be noted that the output signal of the modulator 132 is used for activating the third switching element 84, which in turn causes the second light source 82 to emit a return light pulse 80. The duration of the light pulse 80 is a function of the physical parameter p. The light pulse 80 is directed to the end face of the fiber optical cable 24 and forwarded to the evaluation circuitry 42.

While the forms of the fiber optical sensor system herein described constitute preferred embodiments of the invention, it is to be understood that the invention is not limited to these precise forms of assembly, and that a variety of changes may be made therein without departing from the scope of the invention.

What is claimed is:
1. A fiber optical sensor system for transmission of information from one location to another, comprising in combination:
(a) a fiber optical transmission line having a first end and at least one second end for transmitting light therebetween,
(b) a first light source for emitting a first light beam into said first end of said transmission line;
(c) at least one first receiver element sensitive to the light of said first light source for receiving light of said first light source from said second end of said transmission line and for generating a first electric output signal in accordance with the light received;
(d) electrical energy storage means connected to said first receiver element for receiving said first electric output signal and for storing energy in accordance therewith;
(e) a second light source for emitting a second light beam into said second end of said transmission line, said second light source being energized from said electrical energy storage means and being controlled in dependence upon information to be transmitted; and
(f) a second receiver element sensitive to the light of said second light source for receiving light of said second light source from said transmission line and for generating a second electric output signal in accordance with the light received and thereby in accordance with the transmitted information.

2. The fiber optical sensor system according to claim 1, wherein said first light source is operative to emit repeatedly charge pulses, said charge pulses being received by said first receiving element for supplying said energy storage means with electrical power.

3. The fiber optical sensor system according to claim 1, further comprising at least one electronic component in addition to said second light source, connected to be energized from said energy storage means.

4. The fiber optical sensor system according to claim 1, wherein said energy storage means comprises a storage capacitor connected to said first receiver element for deriving electrical charges from said first receiving element and for storing said charges when said first light source emits said first light beam.

5. The fiber optical sensor system according to claim 4, wherein a diode is connected between said storage capacitor and said first receiver element.

6. The fiber optical sensor system according to claim 1, further comprising a transducer unit containing a sensor element for receiving said information to be transmitted and for supplying an electric sensor output signal in accordance therewith, said transducer unit being connected to and controlling said second light source.

7. The fiber optical sensor system according to claim 1, wherein said information to be transmitted is information about a physical parameter to be measured.

8. The fiber optical sensor system according to claim 7, wherein said transducer unit comprises an RC combination containing a resistor and a capacitor, the time constant of said RC combination being dependent on said physical parameter to be measured.

9. The fiber optical sensor system according to claim 8, wherein said transducer unit further comprises:
(1) means for changing the charge of said capacitor in accordance with said time constant, said means being actuated by an initiation signal issued at a first point of time;

(2) means for sensing the voltage of said capacitor and for determining a second point of time, said second point of time being the point of time when said capacitor voltage has reached a predetermined value; and (3) means for actuating said second light source, said second light source emitting a light pulse when said capacitor voltage has reached said predetermined value and said light pulse being transmitted from said second end to said first end of said optical transmission line;

and wherein said fiber optical sensor system further comprises:

means connected to said second receiver element for measuring the difference between said first and said second point of time, said time difference being a function of said physical parameter to be measured.

10. The fiber optical sensor system according to claim 9, wherein said means for changing the charge of said capacitor of said RC combination comprises a voltage source for charging said capacitor through said resistor of said RC combination.

11. The fiber optical sensor system according to claim 10, wherein said means for changing the charge of said capacitor additionally comprises means for discharging said capacitor.

12. The fiber optical sensor system according to claim 8, wherein said transducer unit contains said resistor and said capacitor in a series connection, wherein said series connection is coupled to a supply voltage source through first switching means, and wherein control means are provided for controlling said first switching means in dependence on an initiation signal.

13. The fiber optical sensor system according to claim 8, wherein said resistor in said RC combination has a resistance which is dependent on said physical parameter.

14. The fiber optical sensor system according to claim 8, wherein said capacitor in said RC combination has a capacitance which is dependent on said physical parameter.

15. The fiber optical sensor system according to claim 10, wherein said voltage source for charging said capacitor is formed by said energy storage means.

16. The fiber optical sensor system according to claim 1, wherein at least one of said receiver elements is a photo diode.

17. The fiber optical sensor system according to claim 1, wherein at least one of said light sources is a light emitting diode.

18. The fiber optical sensor system according to claim 11, wherein said means for changing the charge of said capacitor comprises a first voltage source of a predetermined polarity for charging said capacitor and a second voltage source of reverse polarity for subsequently discharging said capacitor.

19. The fiber optical sensor system according to claim 18, wherein two resistors are connected across a supply voltage source to form a voltage divider, and wherein one of said resistors is connected to form said first voltage source and the other one of said resistors is connected to form said second voltage source.

20. The fiber optical sensor system according to claim 18, wherein second switch means are connected between said second voltage source and said capacitor of said RC combination.

21. The fiber optical sensor system according to claim 20, wherein a delay member is provided for controlling said second switch means such as to apply said voltage of reverse polarity to said capacitor at a predetermined period of time after said initiating signal was issued.

22. The fiber optical sensor system according to claim 1, wherein said energy storage means is connected to said second light source through third switch means, whereby said energy storage means supplies said second light source with electric energy for emission of said second light beam when said third switch means is in an ON position.

23. The fiber optical sensor system according to claim 9, wherein said energy storage means is connected to said second light source through third switch means, whereby said energy storage means supplies said second light source with electric energy for emission of said second light beam when said third switch means is in an ON position, and wherein said third switch means is actuated by said voltage sensing means.

24. The fiber optical sensor system according to claim 1, further comprising output means for delivering an output signal in dependence on said time difference and thereby in dependence on said physical parameter.

25. The fiber optical sensor system according to claim 1, wherein an encoder is provided for controlling said first light source as to emit a series of coded light pulse patterns, wherein a plurality of receiver elements is optically connected to said fiber optical transmission line, wherein an individual decoder is connected to each of said receiver elements, whereby a predetermined and individualized pulse pattern is associated with each individual decoder, each of said decoders decoding said coded pulse patterns and issuing an initiation signal to said means for changing the charge when the coded pulse pattern received equals its predetermined and individualized pattern.

26. The fiber optical sensor system according to claim 25, wherein said encoder is connected to control said first light source such that at first a storage pulse and subsequently said series of coded light pulse patterns are emitted from said first light source.

27. The fiber optical sensor system according to claim 1, wherein at least said first receiver element and said second light source are arranged in a metal housing.

28. The fiber optical sensor system according to claim 27, wherein said second light source is mounted on said first receiver element.

29. The fiber optical sensor system according to claim 1, wherein said second receiver element is arranged for receiving light from said first end of said transmission line.

30. The fiber optical sensor system according to claim 1, wherein said transducer unit is connected to transform said information into a corresponding electrical quantity, and wherein said second light source is connected to transform said electrical quantity into an optical quantity.

31. The fiber optical sensor system according to claim 1, further comprising a pulse width modulator connected between said sensor and said second light source for supplying control pulses for controlling said second light source, the width of said control pulses being determined by said information to be transmitted.

32. The fiber optical sensor system according to claim 1, wherein said transducer unit is determined to measure a physical parameter in an automobile.

* * * * *